(12) United States Patent
Koester et al.

(10) Patent No.: US 6,845,158 B2
(45) Date of Patent: Jan. 18, 2005

(54) RETRACTABLE-REMOVABLE HEADPHONE MODULE FOR PORTABLE COMPUTERS

(75) Inventors: Scott B. Koester, Austin, TX (US); Charles D. Hood, III, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 389 days.

(21) Appl. No.: 09/909,290

(22) Filed: Jul. 19, 2001

(65) Prior Publication Data

US 2003/0016817 A1 Jan. 23, 2003

(51) Int. Cl.7 .............................................. H04M 1/00
(52) U.S. Cl. ...................................... 379/438; 379/430
(58) Field of Search ................................. 379/430, 438; 455/351; 381/370

(56) References Cited

U.S. PATENT DOCUMENTS

| | | |
|---|---|---|
| 4,941,841 A | 7/1990 | Darden et al. |
| 5,136,446 A | 8/1992 | Yamamoto et al. |
| 5,187,643 A | 2/1993 | I-Shou |
| 5,229,919 A | 7/1993 | Chen |
| 5,339,461 A * | 8/1994 | Luplow ...................... 455/351 |
| 5,483,419 A | 1/1996 | Kaczeus, Sr. et al. |
| 5,572,402 A | 11/1996 | Jeong |
| 5,675,761 A | 10/1997 | Paul et al. |
| 5,682,291 A | 10/1997 | Jeffries et al. |
| 5,832,098 A * | 11/1998 | Chen .......................... 381/370 |

* cited by examiner

*Primary Examiner*—Jack Chiang
(74) *Attorney, Agent, or Firm*—Haynes and Boone, LLP

(57) ABSTRACT

A computer includes a body having a PC card slot formed therein. A headphone module includes a carrier removably mounted in the slot. A retractor member is mounted on the carrier. A flexible cord is extendibly and retractably connected to the retractor member. The cord includes at least one headphone connected to a first cord end and a connector connected to a second cord end opposite the first end. A headphone receptacle is provided on the carrier.

21 Claims, 4 Drawing Sheets

RETRACTABLE-REMOVABLE HEADPHONE MODULE FOR PORTABLE COMPUTERS

BACKGROUND

The disclosures herein relate generally to computer systems and more particularly to a removable headphone module for a notebook computer which has a retractable cord.

Notebook computers are frequently used by travelers in situations where listening to audio through the notebook speakers is not feasible due to possible noise pollution to others in the vicinity. This problem has become more common as notebook computers become more widely used for their multimedia ability. The increased use of MP3s and DVDs are examples.

Currently, many notebook users carry headphones with them to plug into their notebooks when such situations arise. Because the headphones are not part of the notebook, they may be lost or forgotten. Headphone cords may get tangled or damaged inside a computer bag. Some standalone headphones on the market do have a self-retracting feature which helps keep the cord untangled and out of the users way, but these still take up space in the computer bag and are not convenient to carry.

Therefore, what is needed is a headphone module which inserts into a notebook computer and includes a cord retracting feature.

SUMMARY

One embodiment, accordingly, provides a retractable-removable headphone module for a notebook computer. To this end, a headphone module assembly includes a carrier and a retractor member mounted on the carrier. A flexible cord is extendibly and retractably connected to the retractor member. The cord includes at least one headphone connected to a first cord end and a connector connected to a second cord end opposite the first end. A headphone receptacle is provided on the carrier.

A principal advantage of this embodiment is that the headphones are retractable and storable in the carrier which is mounted in a slot in the notebook computer.

DETAILED DESCRIPTION

Figure 1:
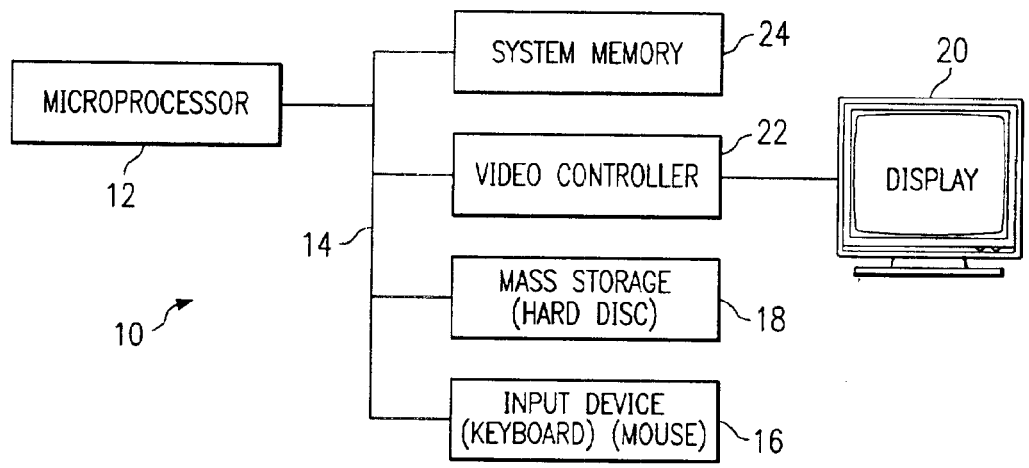
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
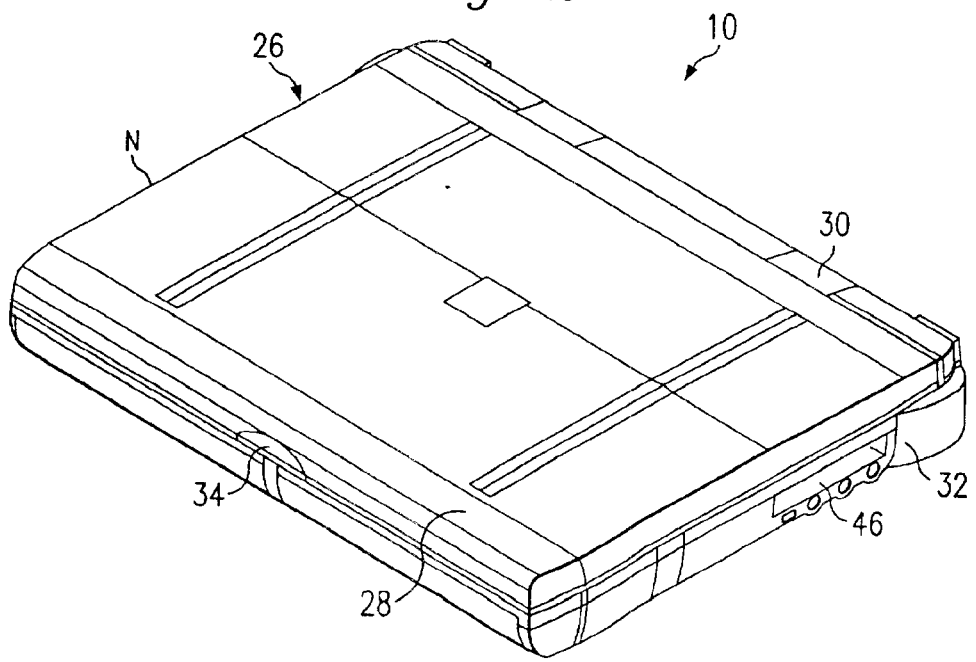
FIG. 2 is a perspective view illustrating an embodiment of a portable computer.
Figure 3:
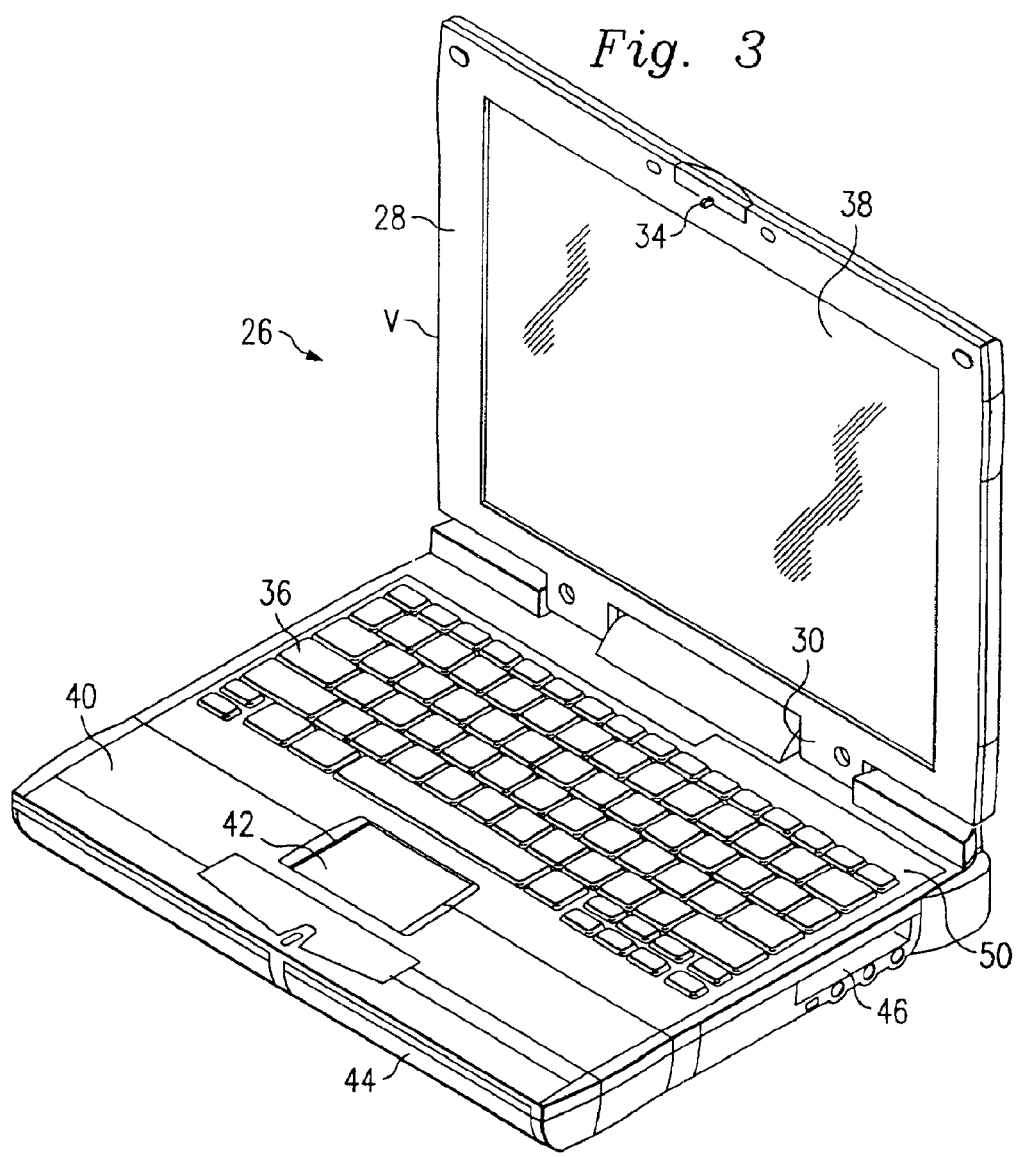
FIG. 3 is another perspective view illustrating an embodiment of a portable computer.

Referring to FIG. 2, illustrated is a portable, notebook size computer designated 26 comprising a self-contained system, such as that illustrated at 10 in FIG. 1, and including a hinged top or lid 28 rotatable about a hinge or hinges 30 from a nested position, "N," with a horizontal chassis base 32, to a substantially vertical or open position "V," FIG. 3. Opening of the notebook style portable computer by manipulation of a latch 34, reveals a plurality of input components such as a keyboard of keys 36 on base 32, and a monitor screen 38 mounted in lid or top 28. Base 32 includes a palm or wrist rest area 40 including an input area 42 of the input system 16 positioned above a battery housing 44 and adjacent keys 36. Base 32 includes an exterior surface 50. The keyboard keys 36 and also the adjacent palmrest area 40 are provided on the exterior surface 50. Base 32 also includes a PC card slot 46 formed in a side 48 of the base 32.

Figure 4:
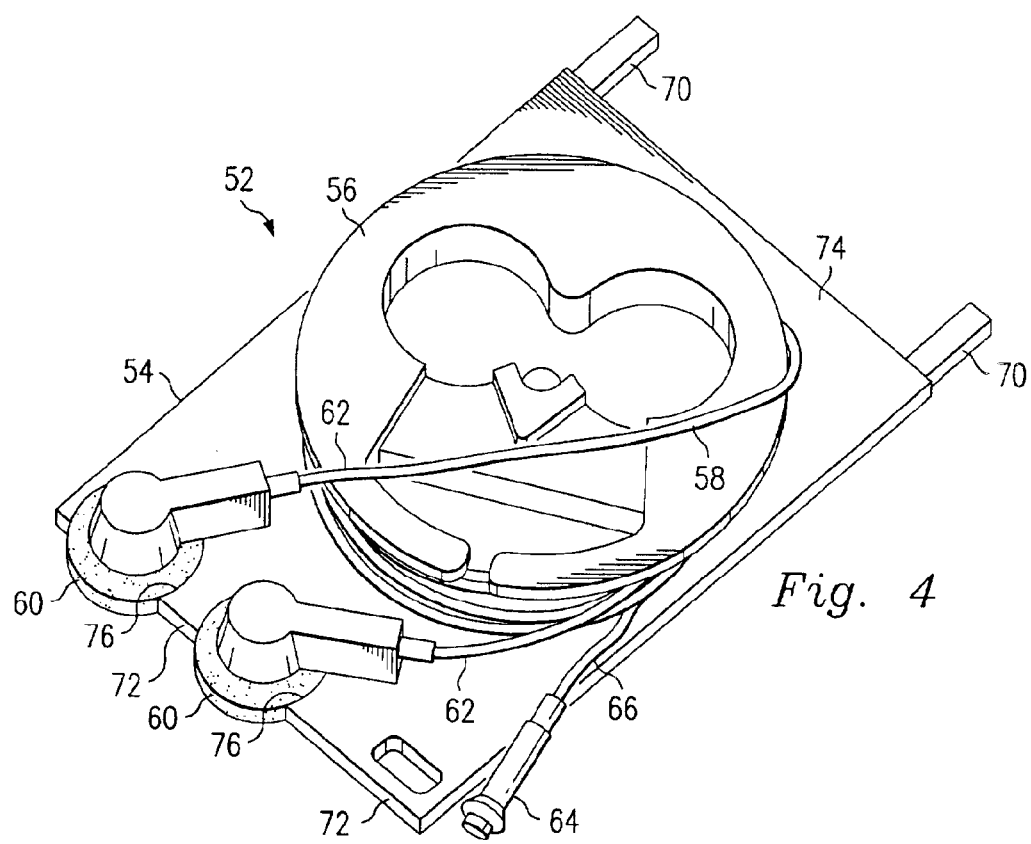
FIGS. 4 and 4a are perspective views illustrating alternate embodiments of a headphone carrier.
Figure 5:
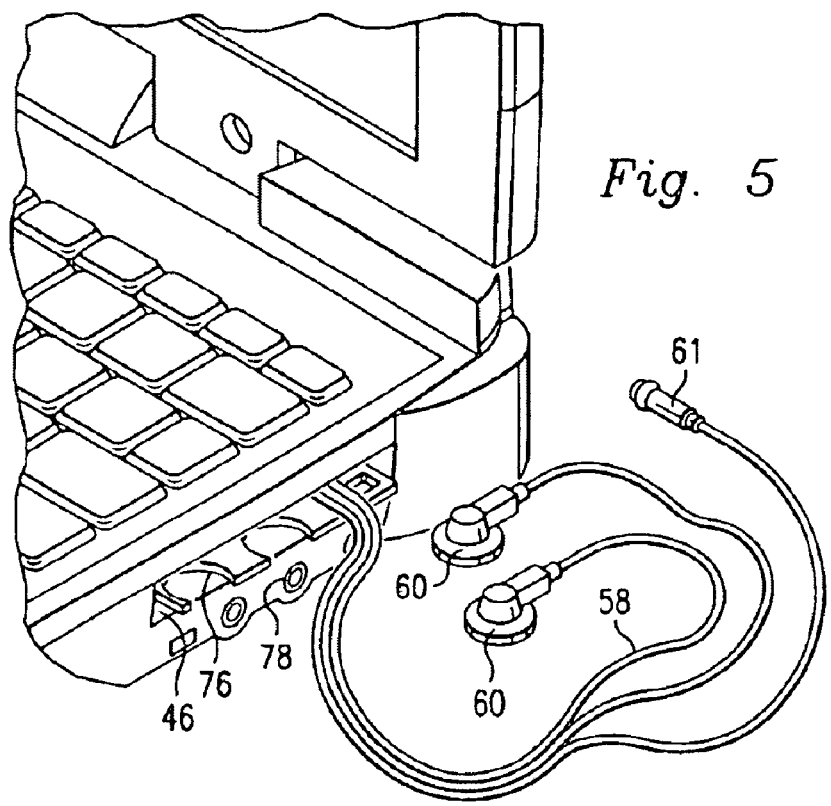
FIGS. 5 and 6 are perspective views illustrating an embodiment of a headphone carrier mounted in a PC card slot.
Figure 6:
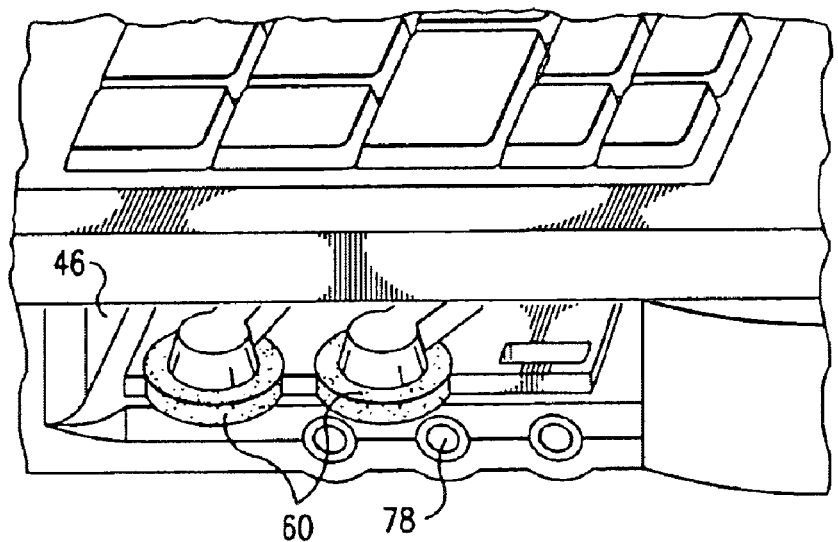

A headphone module assembly ig generally designated 52 in FIGS. 4–6, and includes a carrier 54, a retractor member 56 mounted on carrier 54, and a flexible cord 58 which is extendibly and retractably connected to the retractor member 56. The cord 58 includes at least one headphone 60, and preferably two headphones 60, connected to a first cord end 62, and a connector 64 which is connected to a second cord end 66, opposite the first end 62. The carrier 54 includes a headphone receptacle 76.

The carrier 54 is similar to a PC card carrier and includes side rails 70, FIG. 4, for slidably mounting carrier 54 in, and removing carrier 54 from, the PC card slot 46, see also FIGS. 2, 3, 5 and 6. Carrier 54, FIG. 4, includes a first end 72 and a second end 74, opposite the first end 72. First end 72 includes receptacles 76 for each headphone 60, which as stated above may include two headphones. Connector 64 is adjacent the headphone receptacles 76 so that the connector 64 can be plugged into a readily available headphone jack 78 normally provided adjacent the PC card slot 46 in computer base 32.

Figure 4A:
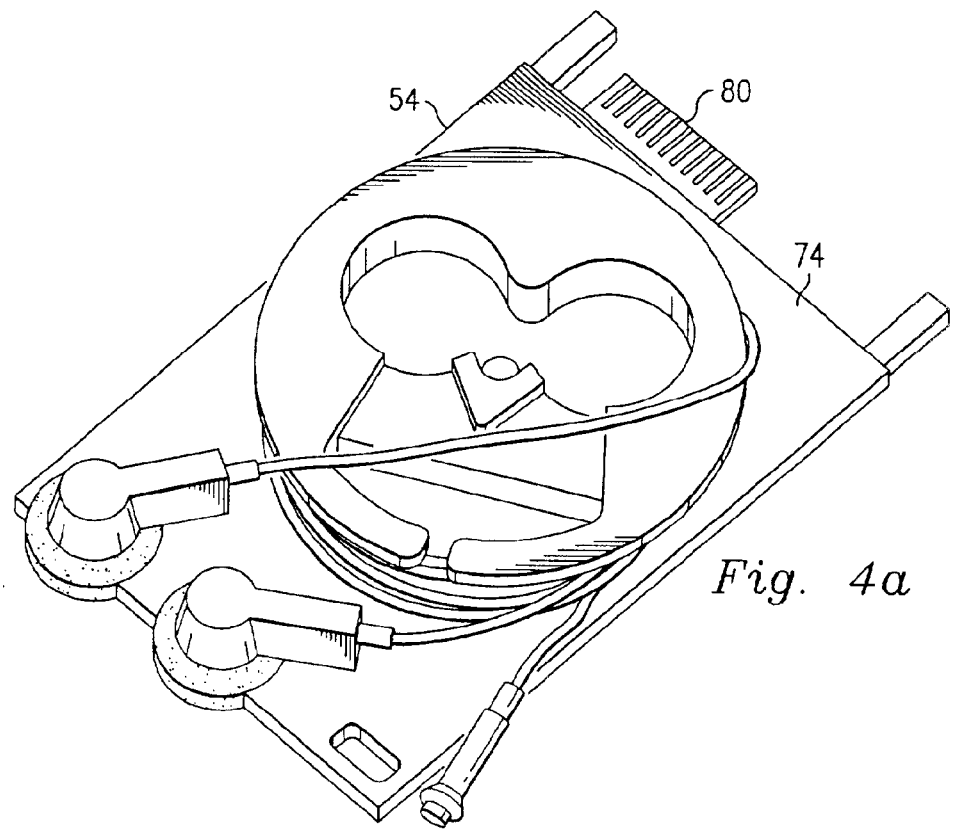

In an alternative embodiment, FIG. 4a, a card type connector 80 may be included on the second end 74 of carrier 54. Because USB to analog codecs are available, this will enable the headphones 60 to pull audio from a PC card data bus in the computer base 32, instead of relying on an additional analog input. Thus, a connector (not shown) for receiving the card type connector 80, may be included in PC card slot 46. Also, in FIG. 5, a microphone 61 may be provided and attached to cord 58, if desired.

Retractor member 56, FIGS. 4 and 4a is a commercially available, spring loaded cord reel which permits cord 58 to be extended to a desired length and permits cord 58 to be retracted for storage when headphones 60 are not in use.

In operation, the headphone module can be inserted into the PC card slot of a notebook computer. The headphones are stored in the module and are connected to a cord which can be extended for use and retracted when not in use. The module can also be easily removed from the slot when desired.

As a result, one embodiment provides a headphone module assembly comprising a carrier, a retractor member mounted on the carrier, a flexible cord extendibly and retractably connected to the retractor member. The cord includes at least one headphone connected to a first cord end and a connector connected to a second cord end opposite the first end. A headphone receptacle is provided on the carrier.

Another embodiment provides a computer having a PC card slot formed therein and a headphone module including a carrier removably mounted in the slot. A retractor member is mounted on the carrier and a flexible cord is extendibly and retractably connected to the retractor member. The cord includes at least one headphone connected to a first cord end and a connector connected to a second cord end opposite the first end. A headphone receptacle is provided on the carrier.

A further embodiment provides a computer system comprising a chassis having a PC card slot formed therein, a microprocessor in the chassis, an input coupled to provide input to the microprocessor, a mass storage coupled to the microprocessor, a video controller coupled to the microprocessor and a memory coupled to provide storage to facilitate execution of computer programs by the microprocessor. A headphone module includes a carrier removably mounted in the slot and a retractor member mounted on the carrier. A flexible cord is extendibly and retractably connected to the retractor member. The cord includes at least one headphone connected to a first cord end and a connector connected to a second cord end opposite the first end. A headphone receptacle is provided on the carrier.

As can be seen, the principal advantages of these embodiments are that a self-retracting headphone module fits in the PC card slot. The headphones are in a self-contained module that contains an automatic cord-retracting feature with a cord lock to prevent unwanted cord wind up. The module can be installed or removed at the user's discretion. If failure should occur to the module, the consumer can simply reinstall a new module, which eliminates any need for on-site service of this accessory. The headphone module electrically connects to the notebook through the headphone jack directly below the PC card slot. With modem and LAN connections being more commonly integrated within the notebook, the PC card slots are generally unused and left available for such a module.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A headphone module assembly comprising:
    a headphone module including a carrier operable for mounting in a computer chassis;
    a retractor member mounted on the carrier;
    a flexible cord extendibly and retractably connected to the retractor member, the cord including at least one headphone connected to a first cord end and a connector connected to a second cord end opposite the first end; and
    a headphone receptacle on the carrier.

2. The assembly as defined in claim 1 wherein the cord includes two headphones.

3. The assembly as defined in claim 1 wherein the retractor member is a cord reel.

4. The assembly as defined in claim 1 wherein the carrier includes a first end and a second end opposite the first end, the headphone receptacle being at the first end.

5. The assembly as defined in claim 4 wherein the connector is adjacent the headphone receptacle.

6. The assembly as defined in claim 4 wherein the connector is adjacent the second end.

7. The assembly as defined in claim 1 wherein the carrier includes mounting rails.

8. A computer comprising:
    a body of the computer having a PC card slot formed therein;
    a headphone module including a carrier removably mounted in the slot;
    a retractor member mounted on the carrier;
    a flexible cord extendibly and retractably connected to the retractor member, the cord including at least one headphone connected to a first cord end and a connector connected to a second cord end opposite the first end; and
    a headphone receptacle on the carrier.

9. The computer as defined in claim 8 wherein the cord includes two headphones.

10. The computer as defined in claim 8 wherein the retractor member is a cord reel.

11. The computer as defined in claim 8 wherein the carrier includes a first end and a second end opposite the first end, the headphone receptacle being at the first end.

12. The computer as defined in claim 11 wherein the connector is adjacent the headphone receptacle.

13. The computer as defined in claim 11 wherein the connector is adjacent the second end.

14. The computer as defined in claim 8 wherein the carrier includes mounting rails.

15. A computer system comprising:
    a chassis having a PC card slot formed therein;
    a microprocessor in the chassis;
    a mass storage coupled to the microprocessor;
    a headphone module including a carrier removably mounted in the slot;
    a retractor member mounted on the carrier;
    a flexible cord extendibly and retractably connected to the retractor member, the cord including at least one headphone connected to a first cord end and a connector connected to a second cord end opposite the first end; and
    a headphone receptacle on the carrier.

16. The system as defined in claim 15 wherein the cord includes two headphones.

17. The system as defined in claim 15 wherein the retractor member is a cord reel.

18. The system as defined in claim 15 wherein the carrier includes a first end and a second end opposite the first end, the headphone receptacle being at the first end.

19. The system as defined in claim 18 wherein the connector is adjacent the headphone receptacle.

20. The system as defined in claim 18 wherein the connector is adjacent the second end.

21. The system as defined in claim 15 wherein the carrier includes mounting rails.

* * * * *